United States Patent
Ranz et al.

(10) Patent No.: US 7,632,073 B2
(45) Date of Patent: Dec. 15, 2009

(54) IMPELLER WITH MACHINING ACCESS PANEL

(75) Inventors: Andrew Jason Ranz, Cuba, NY (US); David Carl Seib, Olean, NY (US)

(73) Assignee: Dresser-Rand Company, Olean, NY (US)

( * ) Notice: Subject to any disclaimer, the term of this patent is extended or adjusted under 35 U.S.C. 154(b) by 463 days.

(21) Appl. No.: 11/148,062

(22) Filed: Jun. 8, 2005

(65) Prior Publication Data

US 2006/0280609 A1   Dec. 14, 2006

(51) Int. Cl.
F01D 5/04 (2006.01)
(52) U.S. Cl. .................... 416/186 R; 416/213 R
(58) Field of Classification Search .......... 416/185, 416/186 R, 188, 213 R, 223 B; 29/889, 889.21, 29/889.22, 889.23
See application file for complete search history.

(56) References Cited

U.S. PATENT DOCUMENTS

| | | | |
|---|---|---|---|
| 2,426,746 A | 9/1947 | Price | |
| 2,807,871 A | 10/1957 | Wagner | |
| 3,507,581 A * | 4/1970 | Jensen | 416/182 |
| 3,597,111 A | 8/1971 | Salisbury | |
| 3,764,231 A * | 10/1973 | Hachiya et al. | 416/186 R |
| 4,296,308 A | 10/1981 | Nakahama | |
| 4,342,541 A * | 8/1982 | Leskinen | 416/186 R |
| 4,868,365 A | 9/1989 | Farone | |
| 5,573,374 A | 11/1996 | Giberson | |
| 6,276,899 B1 | 8/2001 | Lambert | |
| 6,515,258 B2 | 2/2003 | Corby | |

FOREIGN PATENT DOCUMENTS

DE   3611910 A1 * 10/1987

OTHER PUBLICATIONS

English translation of DE3611910A1.*

\* cited by examiner

*Primary Examiner*—Edward Look
*Assistant Examiner*—Nathaniel Wiehe
(74) *Attorney, Agent, or Firm*—Haynes and Boone, LLP

(57) ABSTRACT

An impeller assembly is for a fluid machine, such as a compressor, and includes a first, main body and a second body. The main body includes a first section providing at least a substantial portion of either an impeller disc or an impeller cover and a second section spaced generally axially from the first section and providing a portion of the other one of the disc or the cover. A plurality of integrally formed blades extend between and connect the main body first and second sections such that the main body is generally of one piece construction. A plurality of flow channels are defined between the blades and a plurality of access openings extend into the flow channels. The second body provides a remainder of the disc or cover and is attachable to the main body to substantially form an impeller and to close all of the access openings.

27 Claims, 11 Drawing Sheets

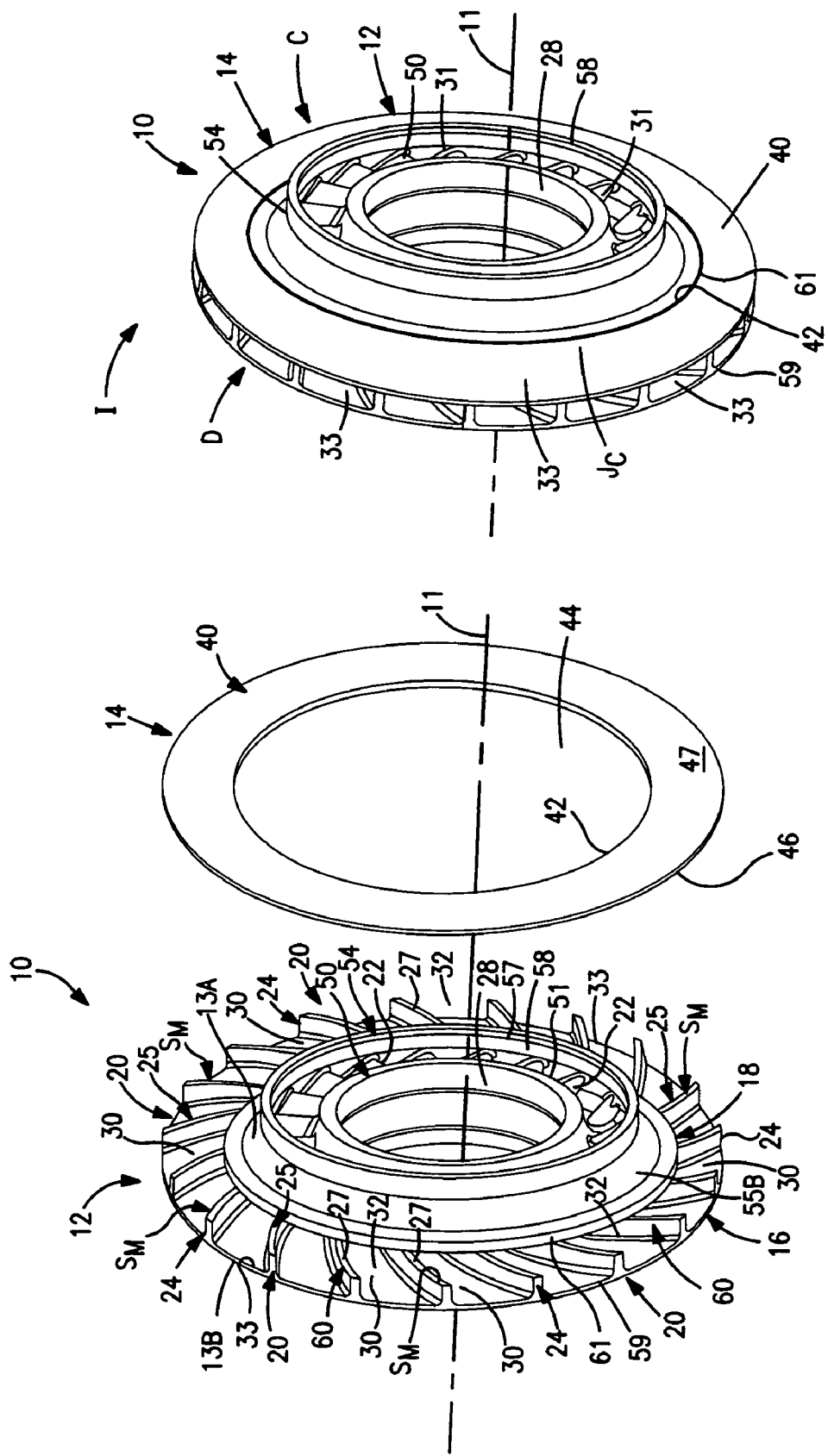

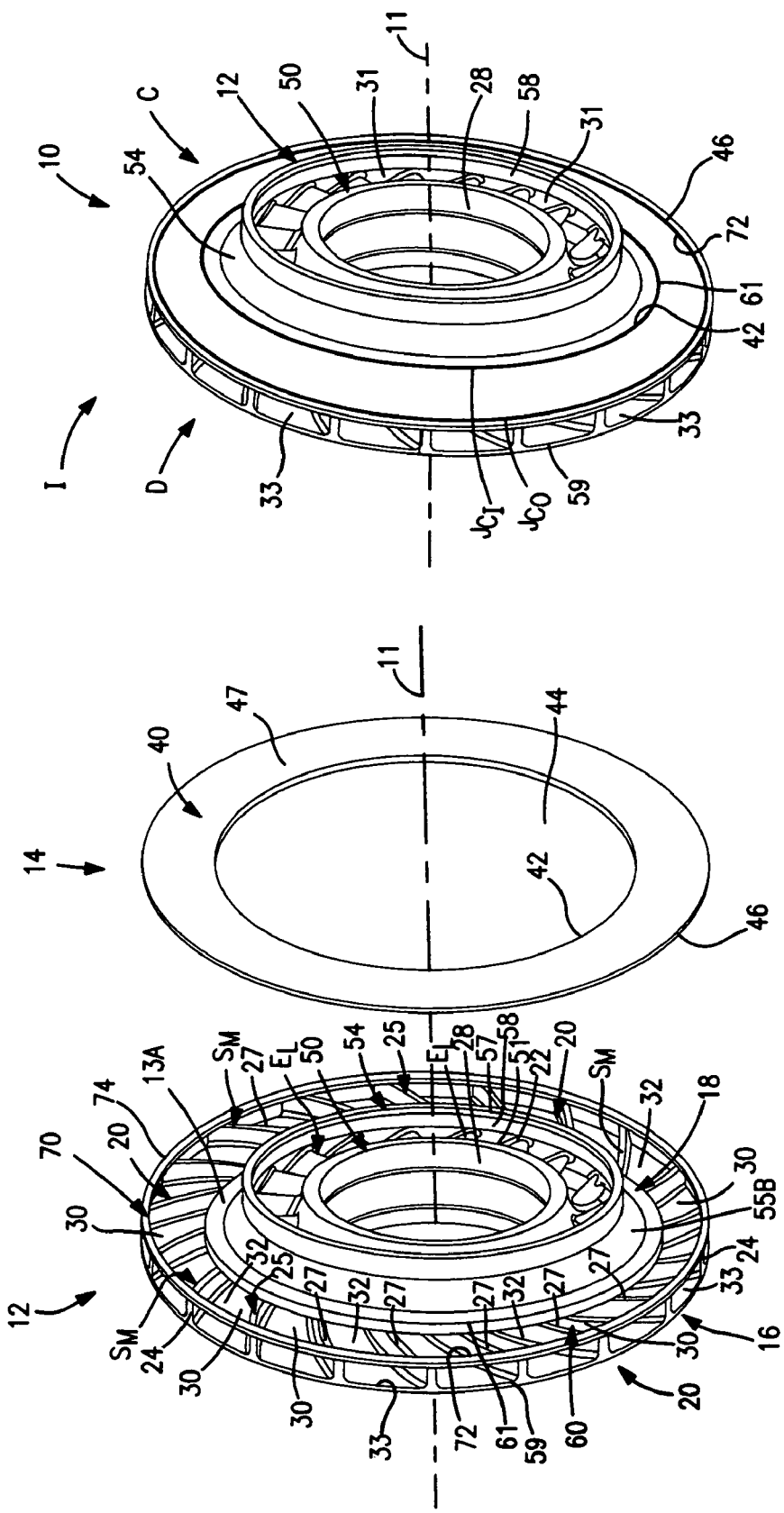

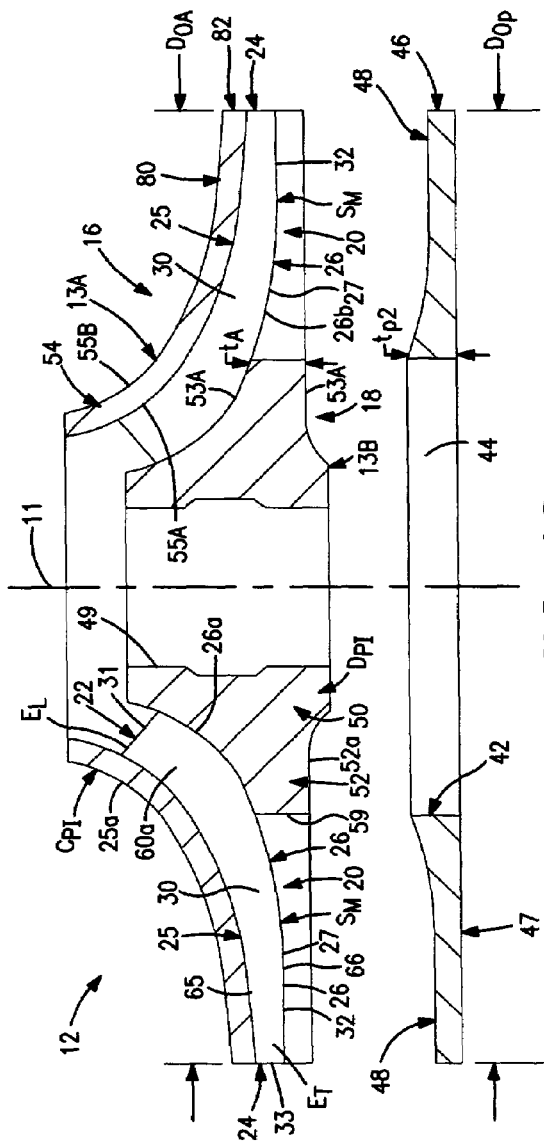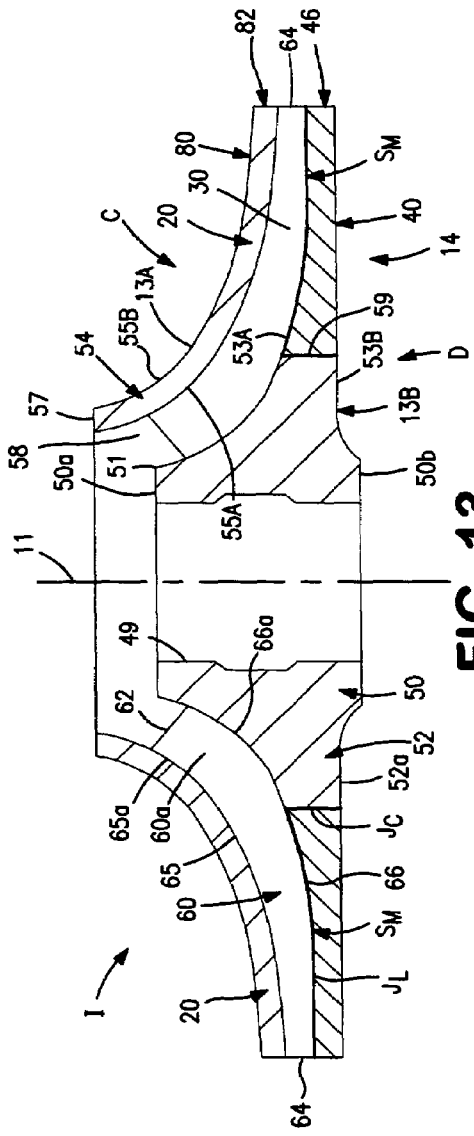
FIG. 12
FIG. 13

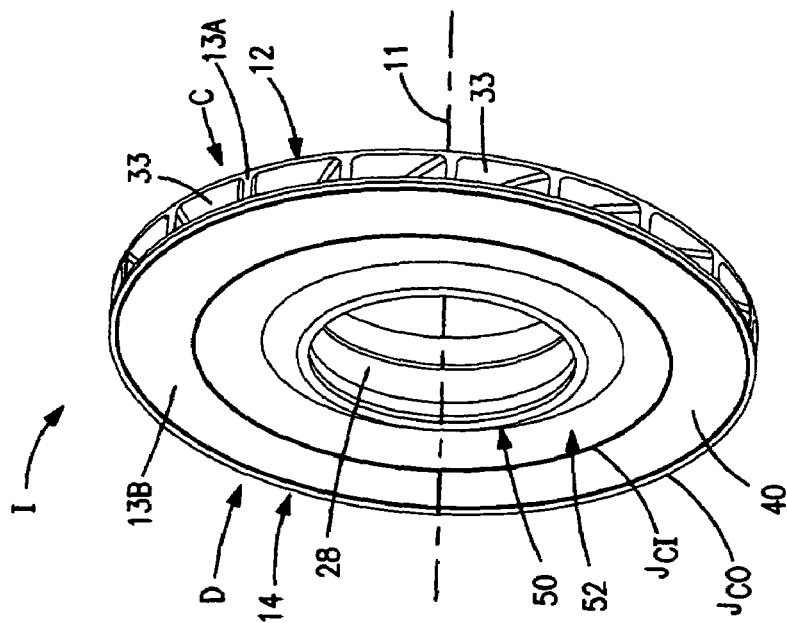
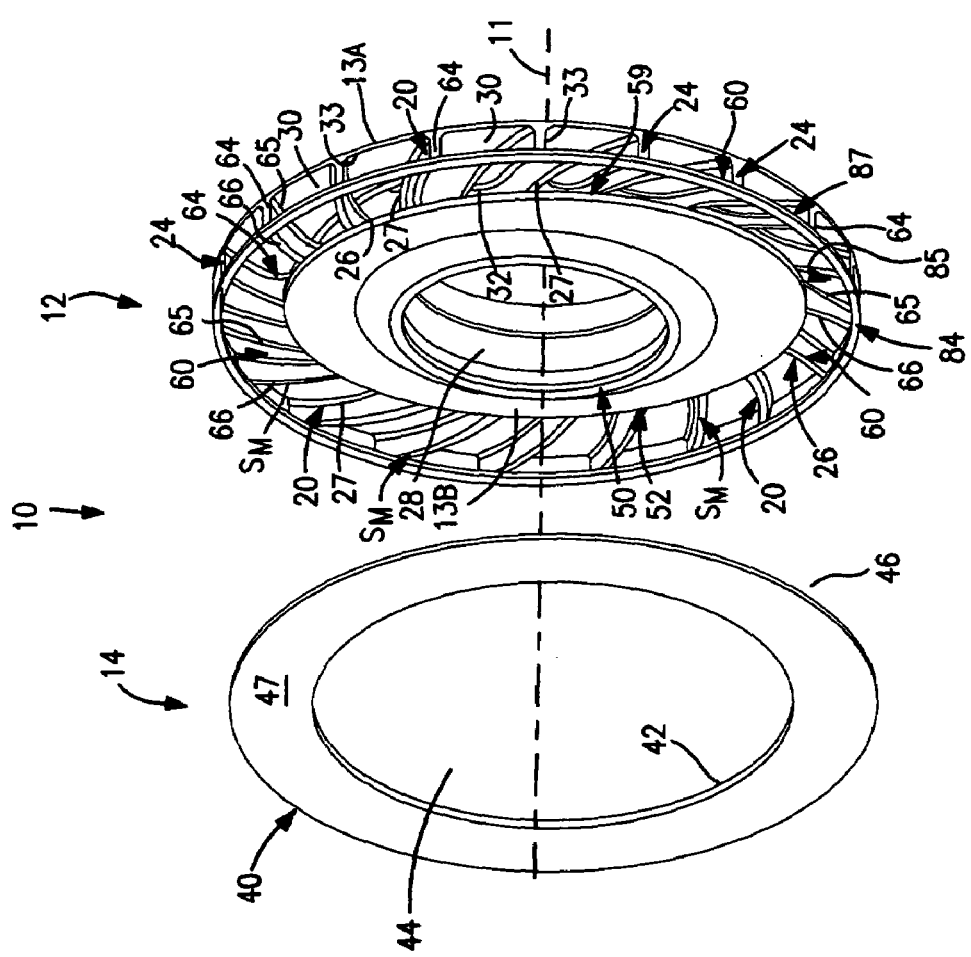

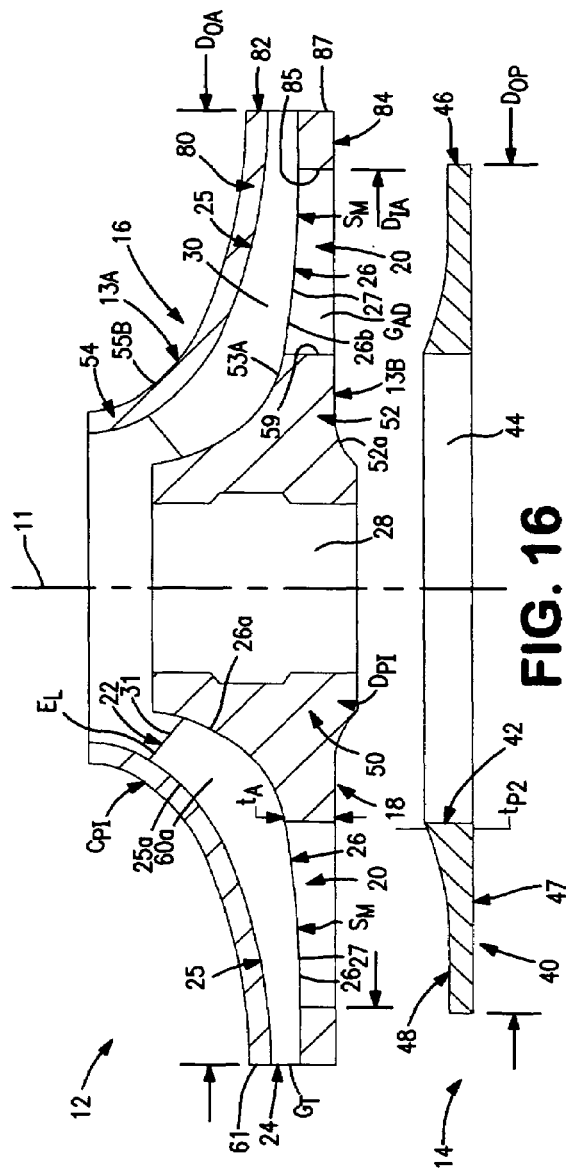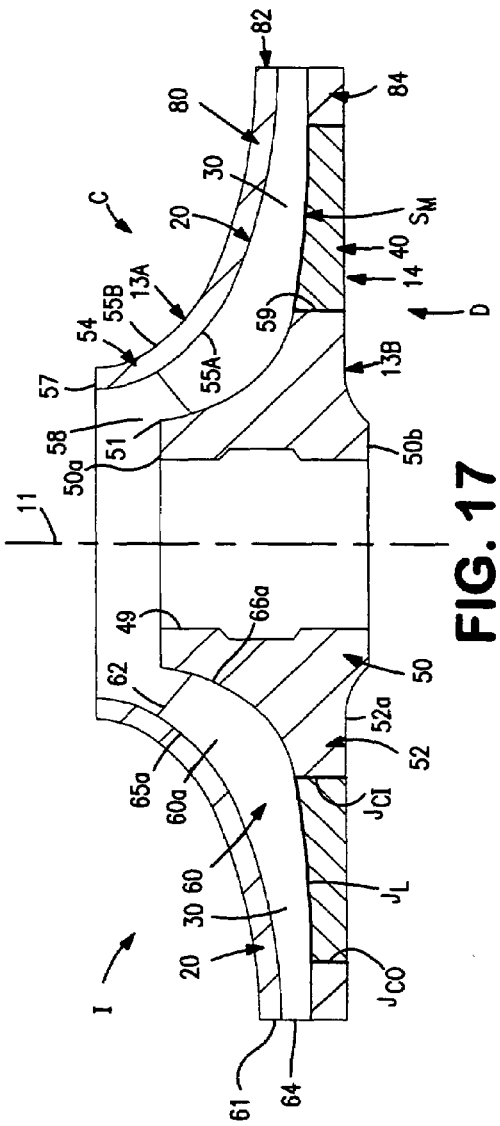

IMPELLER WITH MACHINING ACCESS PANEL

The present invention relates to fluid machinery, and more specifically to impellers for devices such as compressors and pumps.

Impellers for fluid machinery are generally known and typically include a base or "disc" mounted to a rotatable shaft, a plurality of blades attached to the disc and a cover connected with the disc so as to enclose the blades. In operation, fluid enters an impeller through an inlet opening located proximal to the shaft, flows radially outwardly through flow channels defined between the blades, and exits the impeller through one or more outlets located at the outer perimeter of the impeller. Often, impellers are constructed by separately joining the blades to the disc and cover, or by forming the blades to the disk and then joining the blade edges to the cover interior surface. Such joining is generally accomplished by welding, brazing, or any other suitable technique for connecting together the various impeller components. Although such techniques for forming impellers are often satisfactory, there is a risk that defects or abnormalities at the impeller component joints may lead to premature failure of an impeller fabricated in this manner.

SUMMARY OF THE INVENTION

In one aspect, the present invention is an impeller assembly for a fluid machine. The impeller assembly comprises a first, main body having a central axis and including a first section providing at least a substantial portion of one of an impeller disc and an impeller cover and a second section spaced generally axially from the first section and providing a portion of the other one of the disc and the cover. A plurality of integrally formed blades extends between and connects the main body first and second sections such that the main body is generally of one-piece construction. Further, a second body provides a remainder of the other one of the disc and the cover, the second body being attachable to the main body to substantially form an impeller.

In another aspect, the present invention is again an impeller assembly for a fluid machine. The impeller assembly comprises a main body having a central axis and including a first section providing at least a portion of one of an impeller disc and an impeller cover and a second section spaced axially from the first section and providing a portion of the other one of the disc and the cover. A plurality of integrally formed blades extend between and connect the main body first and second sections. Further, a generally annular body providing a remainder of the other one of the disc and the cover is attachable to the main body to substantially form an impeller.

In a further aspect, the present invention is once again an impeller assembly for a fluid machine. The impeller assembly comprises a first, main body having an outer surface and including a first section providing at least a portion of one of an impeller disc and an impeller cover and a second section providing a portion of the other one of the disc and the cover. A plurality of integrally formed blades extend between and connect the body first and second sections and a plurality of flow channels are each defined between a separate one of a plurality of pairs of the blades. Further, a plurality of access openings each extend between the outer surface and a separate one of the flow channels. Also, a second body provides a remainder of the other one of the disc and the cover and is attachable to the main body to substantially form an impeller. The second body is configured to substantially close all of the access openings when the second body is attached to the main body.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 1 is a front perspective view of a first impeller construction of an impeller assembly in accordance with the present invention, shown with an access body separate from a main body;

FIG. 2 is another front perspective view of the impeller assembly of FIG. 1, showing the access body attached to the main body;

FIG. 5 is a front perspective view of a variation of the first impeller construction having a cover annular portion and shown with the access body separate from the main body;

FIG. 6 is another perspective view of the impeller assembly of FIG. 5, showing the access body attached to the main body;

FIG. 12 is an axial cross-sectional view of the impeller assembly of FIG. 9;

FIG. 13 is an axial cross-sectional view of the impeller assembly of FIG. 10;

FIG. 14 is a rear perspective view of a variation of the second impeller construction having a disc outer annular portion and shown with the access body separate from the main body;

FIG. 15 is another rear perspective view of the impeller assembly of FIG. 13, showing the access body attached to the main body;

FIG. 16 is an axial cross-sectional view of the impeller assembly construction of FIG. 14;

FIG. 17 is an axial cross-sectional view of the impeller assembly of FIG. 15;

DETAILED DESCRIPTION OF THE INVENTION

Figure 3:
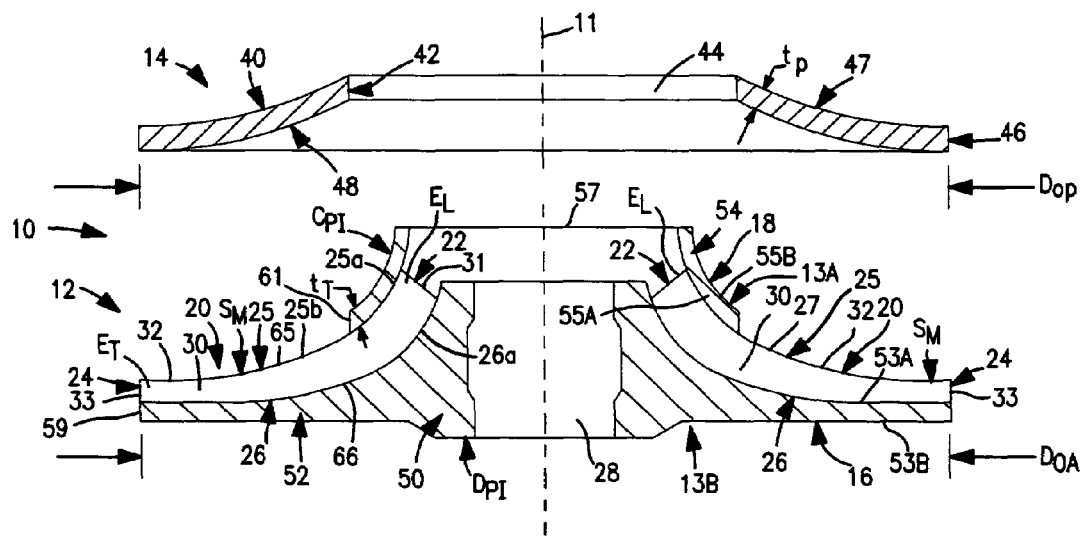
FIG. 3 is an axial cross-sectional view of the impeller assembly construction of FIG. 1.

Certain terminology is used in the following description for convenience only and is not limiting. The words "front" and "rear" refer to designated front and rear sides of an impeller assembly or component thereof. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-20 an impeller assembly 10 for a fluid machine 1, preferably a centrifugal compressor 2 with a rotatable shaft 3 (see FIG. 20), in accordance with the present invention. The impeller assembly 10 basically comprises a first, main body 12 and a second body 14 attachable to the main body 12 to substantially form an impeller I, but enabling access to interior regions or sections of the main body 12 when separate therefrom, as discussed below. The main body 12 has a central axis 11 and opposing front and rear axial ends or sides 13A, 13B, and includes first and second sections 16, 18. The first section 16 provides at least a substantial portion, and preferably about the entirety, of either an impeller disc D or an impeller cover C. The second section 18 is spaced generally axially from the first section 16 and provides only a portion of the other one of the disc D and the cover C, and a plurality of integrally formed blades 20. The blades 20 extend between and connect together the main body first and second sections 16, 18, respectively, such that the main body 12 is generally of one-piece construction. The second body 14 provides a remainder of the other one of the disc D and the cover C, specifically to the section 16 or 18 providing only a portion of the disc D or cover C and/or to portions of the blades 20. Preferably, the second body 14 is permanently or fixedly attachable to the main body 12, but may alternatively be semi-permanently or even removably attachable thereto, as discussed below.

Further, the plurality of blades 20 are spaced apart circumferentially about the main body axis 11 such that each blade 20 extends generally radially with respect thereto. Each blade 20 has an inner end 22 located generally proximal to the central axis 11, an opposing outer end 24, and two spaced apart, front and rear sides 25, 26 extending generally radially between the two ends 22, 24. The main body 12 includes radially-innermost portions $D_{PI}$, $C_{PI}$ of the disc D and the cover C such that at least a radially-innermost portion 25a, 26a of each one of the two sides 25, 26 of each blade 20 is integrally formed with the main body first and second sections 16, 18. As such, no welding, brazing or other joining operation is required at the "leading edge" $E_L$ of each blade 20, thereby eliminating the defects or abnormalities that may be found at such joints, which are often enlarged during heat treatment and may cause premature failure of the impeller I. Further, one of the two sides 25 or 26 of each blade 20 has a radially-outermost portion 25b, 26b with an edge surface 27 unconnected with a remainder of the main body 12, which provides a mounting surface $S_M$. With this structure, the second body 14 is disposable simultaneously generally against the mounting surfaces $S_M$ of all of the plurality of blades 20 when attached to the main body 12, as described in further detail below.

Referring to FIGS. 1-17, the impeller main body 12 preferably has a through bore 28 extending axially through the body first and second sections 12, 14, respectively, at least a portion of the fluid machine shaft 3 being disposeable within the main body through bore 28 to couple the impeller I with the machine 1. Further, the main body 12 also has a plurality of flow channels 30, each channel 30 being defined between a separate pair of adjacent blades 20, and a plurality of access openings 32. Each flow channel 30 has an inlet 31 located generally proximal to the central axis 11 and an outlet 33 located generally distally from the axis 11, and is configured to direct fluid generally radially outwardly from the axis 11. Further, each access opening 32 is defined between a separate pair of adjacent blade edge surfaces 27 and extends between one of the main body axial sides 13A (FIGS. 1-8) or 13B (FIGS. 9-17) and a separate one of the flow channels 30. Further, each access opening 32 is configured (i.e., sized, oriented, etc.) to permit insertion of at least a portion of a tool T (e.g., a contour grinder, an end mill, etc.) into the fluidly connected channel 30 for finish machining of the impeller I. Specifically, each access opening 32 enables the tool(s) T to enter the connected channel 30 for machining of sections of the pair of blades 20 defining the particular channel 30 and interior portions/surfaces of the disc D and cover C located generally between the two blades 20, as described in further detail below.

Furthermore, the impeller second body 14 is configured to substantially close all of the access openings 32 when the second body 14 is attached to the main body 12, and thus serves the purpose of an access panel, as discussed in greater detail below. In other words, when the "access" body 14 is separate from the impeller main body 12, all portions of the body 12 may be machined to desired, final or finished dimensions, including interior surfaces that are otherwise difficult to reach without the access openings 32. Thereafter, the access body 14 is disposeable generally against the one side 13A or 13B of the main body 12 as to close all the access openings 32, and is attached to the main body 12, most preferably welded or brazed, as described below, but may be removably or fixedly attached by mechanical fastening (e.g., rivets, bolts, etc.).

Preferably, the second body 14 includes a generally annular plate 40 having inner circumferential edge surface 42 defining a central opening 44 and an opposing outer circumferential edge surface 46. A generally planar interior or "contact" surface 48 and an opposing, exterior surface 47 each extends generally radially between the two edge surfaces 42, 46. The contact surface 48 is disposeable against a portion of each of the plurality of blades 20, specifically against all of the blade mounting surfaces $S_M$, as discussed above and in further detail below. The contact surface 48 and/or either or both of the two circumferential edge surfaces 44, 46 is joined (e.g., welded, brazed, etc.) to the impeller main body 12 to attach the access body 14 thereto, as discussed in further detail below.

Still referring to FIGS. 1-17, the one main body first or second section 16 or 18, respectively, that provides at least a portion of the impeller disk D preferably includes a generally cylindrical hub portion 50 and a generally annular portion 52 extending generally radially outwardly from the hub portion 50 and having opposing interior and exterior surfaces 53A, 53B. The hub portion 50 preferably has opposing axial ends 50a, 50b, a longitudinal passage 49 extending between the ends 50a, 50b and providing the main body through bore 28, and an outer edge surface 51 extending circumferentially about the axis 11. The other one of the main body first and second sections 16, 18, i.e., the one providing at least a portion of the impeller cover C, preferably includes a generally tubular portion 54 disposed generally coaxially about the hub portion 50, spaced axially from the annular portion 52, and having opposing interior and exterior surfaces 55A, 55B. Further, the plurality of blades 20 extend between and integrally connect the tubular portion 54 with the hub 50 and annular portions 52, thus forming the one-piece structure of the main body 12, as discussed in greater detail below. Preferably, the tubular portion 54 includes an inner edge surface 57 extending circumferentially about the axis 11 and spaced radially outwardly from the hub outer edge surface 51. As such, a generally annular opening 58 is defined between the hub portion edge surface 51 and the tubular portion edge surface 57, the inlet 31 of each one of the plurality of flow channels 30 being fluidly connected with the annular opening 58.

Further, with the preferred main body structure, each blade 20 preferably includes an elongated body 60 with an inner end 62 located generally proximal to the central axis 11, an opposing outer end 64, and two spaced apart, front and rear sides 65, 66, respectively, extending generally radially between the two body ends 62, 64. Each blade body 60 has a radially-innermost portion 60a disposed between the hub portion 52 and tubular portion 54, such that a radially-innermost section 65a of the one blade body side 65 is integrally connected with the tubular portion 54 and a radially-innermost portion 66a of the other blade side 66 is integrally connected with the hub and annular portions 50, 52. Preferably, the radially-innermost body portion 60a of each blade 20 is bended with respect to a remainder of the blade body 60 such that each blade innermost portion 60a extends at least partially along the central axis 11, as best shown in FIGS. 3, 4, 7, 8, 12, 13, 16 and 17. Alternatively, each blade 20 may be formed without the bended portion 60a, so as to extend generally within parallel radial planes, such that the impeller I is generally "two dimensional". Further, each blade body 60 is also preferably curved in a generally circumferential direction with respect to the central axis 11, so as to have a generally spiral form. As such, fluid passing through the flow channels 30 is directed in a partly tangential direction with respect to the central axis 11, as is generally known to those skilled in the art of fluid machinery. However, the blades 20 may be formed in any appropriate manner, such as without the body innermost portion 60a being generally bended, and or with the body 60 being generally "straight" and extending substantially radially as opposed to being "swept back" tangentially.

Referring now to FIGS. 1-8, in a first construction of the impeller assembly 10, the main body 12 has a first section 16 that includes a substantial portion, preferably about the entirety, of the disk D and a second section 18 that includes only a portion of the cover C. As such, the second, access body 14 includes or provides the remainder of the cover C. The main body 12 is formed with the disc annular portion 52 being sized substantially radially larger than the tubular portion 54, such that a tubular portion outer circumferential surface 61 is spaced radially inwardly from, and centered within, the annular portion outer circumferential surface 59. Thus, the mounting surface $S_M$ of each blade 20 is provided on an unconnected or "free" section of each blade body front side 65, which extends generally radially between the two outer circumferential edge surfaces 59, 61. With this structure, the preferred second body plate 40 is mountable to the main body 12 such that the tubular portion 54 is generally disposed at least partially within, and extends through, the plate central opening 44 and the plate contact surface 48 is generally disposed against all of the blade mounting surfaces $S_M$ provided on the blade body front sides 65.

When the access plate 40 is mounted to the impeller main body 12, the plate inner circumferential edge surface 42 may either be disposed generally against or in contact with (i.e., "juxtaposed") the tubular portion outer edge surface 61, or an annular gap (not indicated) may be formed between the facing circumferential surfaces 42, 61 for receiving welding or brazing material used to join the two surfaces 42, 61. Furthermore, the second body plate 40 preferably has a thickness $t_{P1}$ sized to match with the thickness $t_T$ of the mating tubular portion 54 (see FIGS. 3 and 7) and the plate 40 has generally curved cross-sectional shape or profile such that the plate exterior surface 47 is generally flush with the tubular portion exterior surface 55B and the plate interior surface 48 mates against the curved blade mounting surfaces $S_M$, as best shown in FIGS. 3, 4, 7 and 8. However, the plate thickness $t_{P1}$ may be greater or lesser than the tubular portion thickness $t_T$, and/or may be tapering or non-constant in a radial direction, or/and the plate 40 may be generally "flat" with planar surfaces 47, 48.

Figure 4:
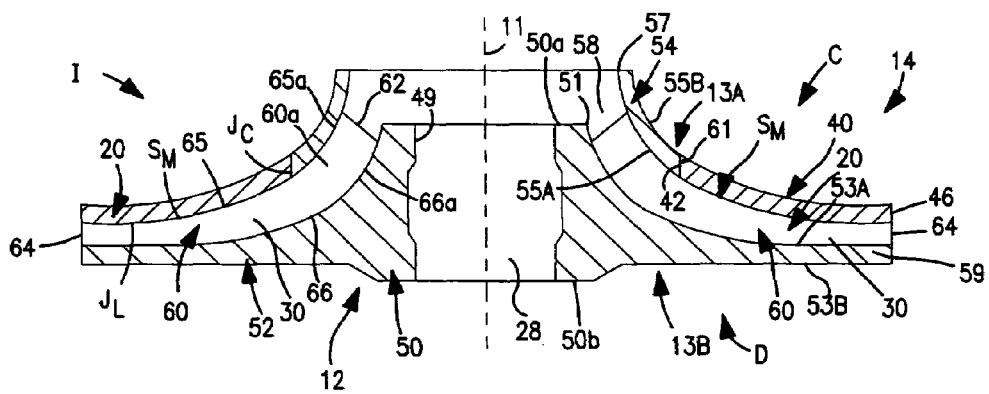
FIG. 4 is an axial cross-sectional view of the impeller assembly of FIG. 2.

Further, the first impeller assembly construction may either have a main body 12 with blade outer ends 24 connected only with the disc annular portion 52 and a relatively radially larger access plate 40 (FIGS. 1-4), or the impeller assembly 10 may have a main body 12 with a "cover" annular portion 70, such that blade ends 24 are integrally connected with both the disc and cover portions 52, 70, and a relatively radially smaller plate 40 (FIGS. 5-8). Referring first to FIGS. 1-4, the "larger" access plate 40 is preferably sized such that the plate 40 has an outside diameter Dop that is generally equal to an outside diameter $D_{OA}$ of the main body annular portion 52. In which case, when the plate 40 is mounted to the main body 12, the plate outer circumferential edge surface 46 and the annular portion outer edge surface 59 are generally axially aligned at the outer circumferential perimeter of the impeller I, and the blade outer ends 24 are all located proximal to the plate outer edge surface 46. As shown in FIGS. 2 and 4, the plate 40 may be fixedly attached to the main body 12 by joining at least a portion of the plate inner circumferential edge surface 42 with the tubular portion outer circumferential edge surface 61, so as to form a circumferential joint $J_C$. Additionally or alternatively to the circumferential joint $J_C$, the plate contact surface 48 may be joined with at least a portion of at least one, and preferably all, of the blade mounting surfaces $S_M$ to thereby form one or more separate linear joint $J_L$.

Figure 7:
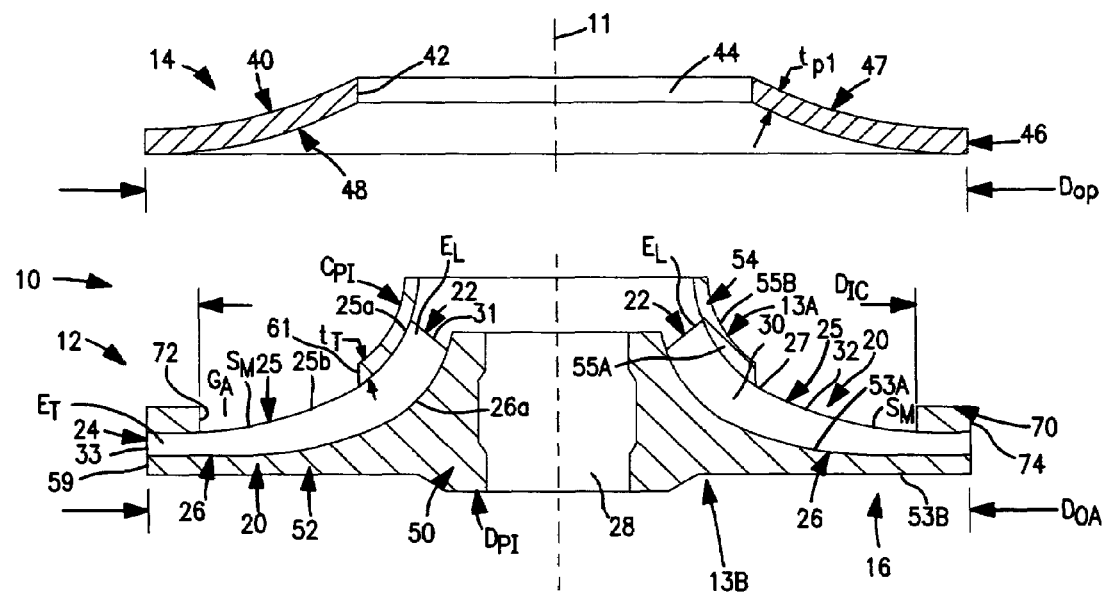
FIG. 7 is an axial cross-sectional view of the impeller assembly of FIG. 5.

Referring to FIGS. 4-8, with the impeller structure having a smaller plate 40 and a cover annular portion 70, the plate outside diameter $D_{OP}$ is lesser than the cover annular portion outside diameter $D_{OA}$ (see FIG. 7). The cover annular portion 70 is disposed generally coaxially about the tubular portion 54, is spaced axially from the disk annular portion 52, and has inner and outer circumferential edge surfaces 72, 74 and an inside diameter $D_{IC}$. The inner circumferential surface 72 is spaced radially outwardly from the tubular portion outer circumferential edge surface 61, such that a generally annular gap $G_A$ is defined between the cover annular portion 70 and the tubular portion 54. The gap $G_A$ is sized to receive at least a portion of the access plate 40, such that the plate 40 is disposeable generally between the two main body portions 54, 70. As best shown in FIGS. 5 and 7, each blade mounting surface $S_M$ extends generally radially between the facing circumferential surfaces 61, 72, and thus generally across the annular gap $G_A$, and the blade body outer ends 64 are all integrally connected with both the disc and cover annular portions 52, 70. Thus, no joining (i.e., welding, brazing, etc.) is required at the blade outer or "trailing" edges $E_T$, which further contributes to an increased "life" of the impeller I.

Figure 8:
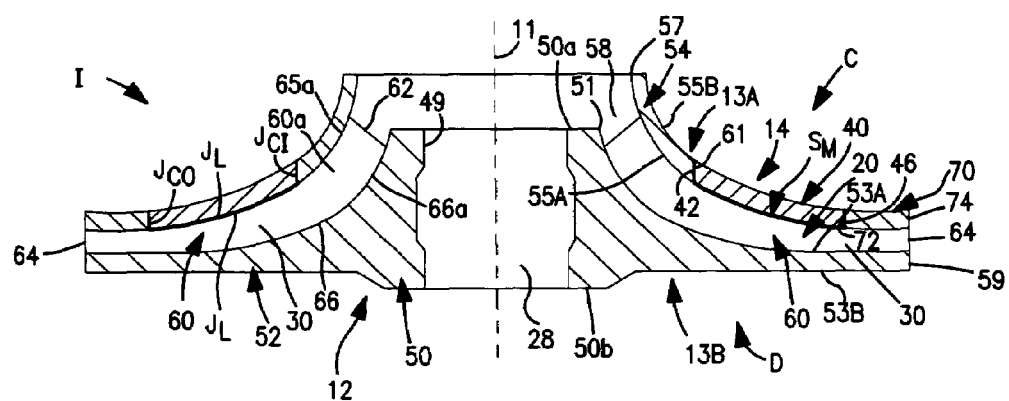
FIG. 8 is an axial cross-sectional view of the impeller assembly of FIG. 6.

Further, as depicted in FIGS. 6 and 8, when the second body plate 40 is mounted to the main body 12, the plate 40 may be fixedly attached by joining at least a portion of the plate inner circumferential surface 42 with the tubular portion outer circumferential surface 61, to form an inner circumferential joint $J_{CI}$, and/or the plate outer circumferential surface 46 may be joined with the cover annular portion inner circumferential surface 72, so as to form an outer circumferential joint $J_{CO}$. Additionally or alternatively to the circumferential joints $J_{CI}$, $J_{CO}$, the plate contact surface 48 may be joined with at least a portion of at least one, and preferably all, of the blade mounting surfaces $S_M$ to form one or more separate linear joint $J_L$.

Referring now to FIGS. 9-17, in a second construction of the impeller assembly 10, the main body 12 has a first section 16 that includes a substantial portion, preferably about the entirety, of the cover C and a second section 18 that includes only a portion of the disc D. As such, the second, access body 14 includes or provides the remainder of the disc D. Preferably, the impeller main body 12 includes a generally annular portion 80 integrally formed with and extending radially outwardly from the tubular portion 54. The "cover" annular portion 80 has an outer circumferential surface 82 spaced radially outwardly from the disc annular portion outer surface 59. As such, the mounting surface $S_M$ of each blade 20 is provided on an unconnected or "free" section of each blade body rear side 66, which extends generally radially between the two outer circumferential edge surfaces 59, 82. With this structure, the preferred access plate 40 is mountable to the rear side 13B of the main body 12, such that the disc annular portion 52 is generally disposed at least partially within the plate central opening 44, the plate contact surface 48 is generally disposed against all of the blade mounting surfaces $S_M$, and the plate inner circumferential edge surface 42 is either disposed generally against, or slightly spaced from, the disc annular portion outer edge surface 59. Furthermore, the plate 40 preferably has an inner thickness $t_{P2}$ sized to match with the thickness $t_A$ of the mating disc annular portion 52 and has a generally rectangular cross-sectional shape or profile such that the plate exterior surface 47 is generally flush with the disc annular portion exterior surface 52a, although the contact surface 48 is preferably slightly curved to match the shape of blade body rear sides 66, as best shown in FIGS. 12, 13, 16 and 17. However, the plate thickness tp2 may be greater or lesser than the disc annular portion thickness $t_A$, and/or may be tapering or non-constant in a radial direction, or/and the plate 40 may be generally flat with planar surfaces 47, 48.

Figure 10:
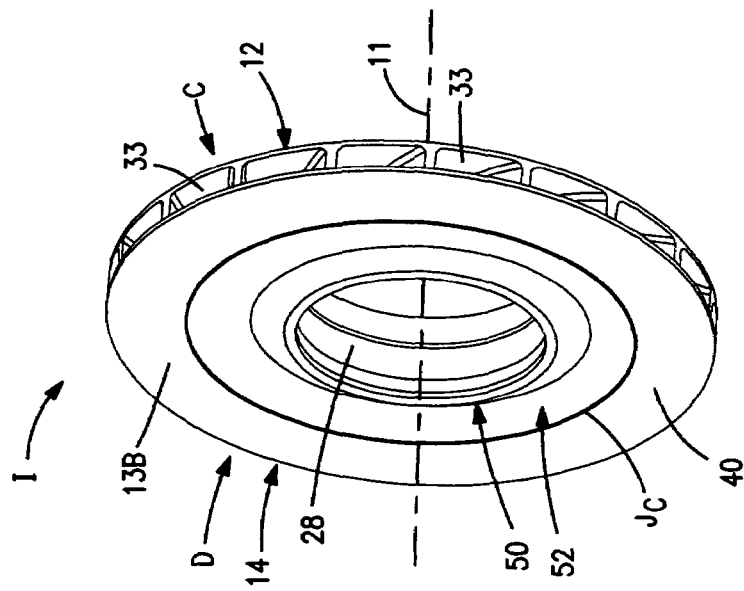
FIG. 10 is another rear perspective view of the impeller assembly of FIG. 9, showing the access body attached to the main body.
Figure 9:
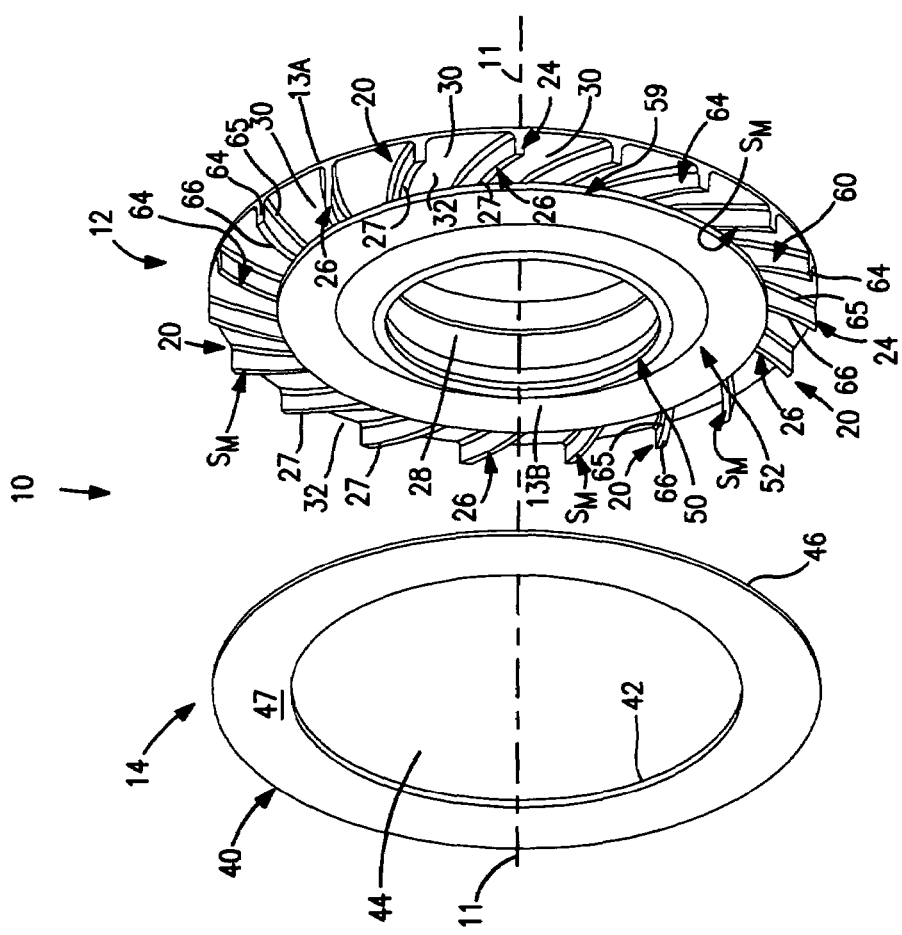
FIG. 9 is a rear perspective view of a second impeller construction of the impeller assembly of the present invention, shown with the access body separate from the main body.
Figure 11:
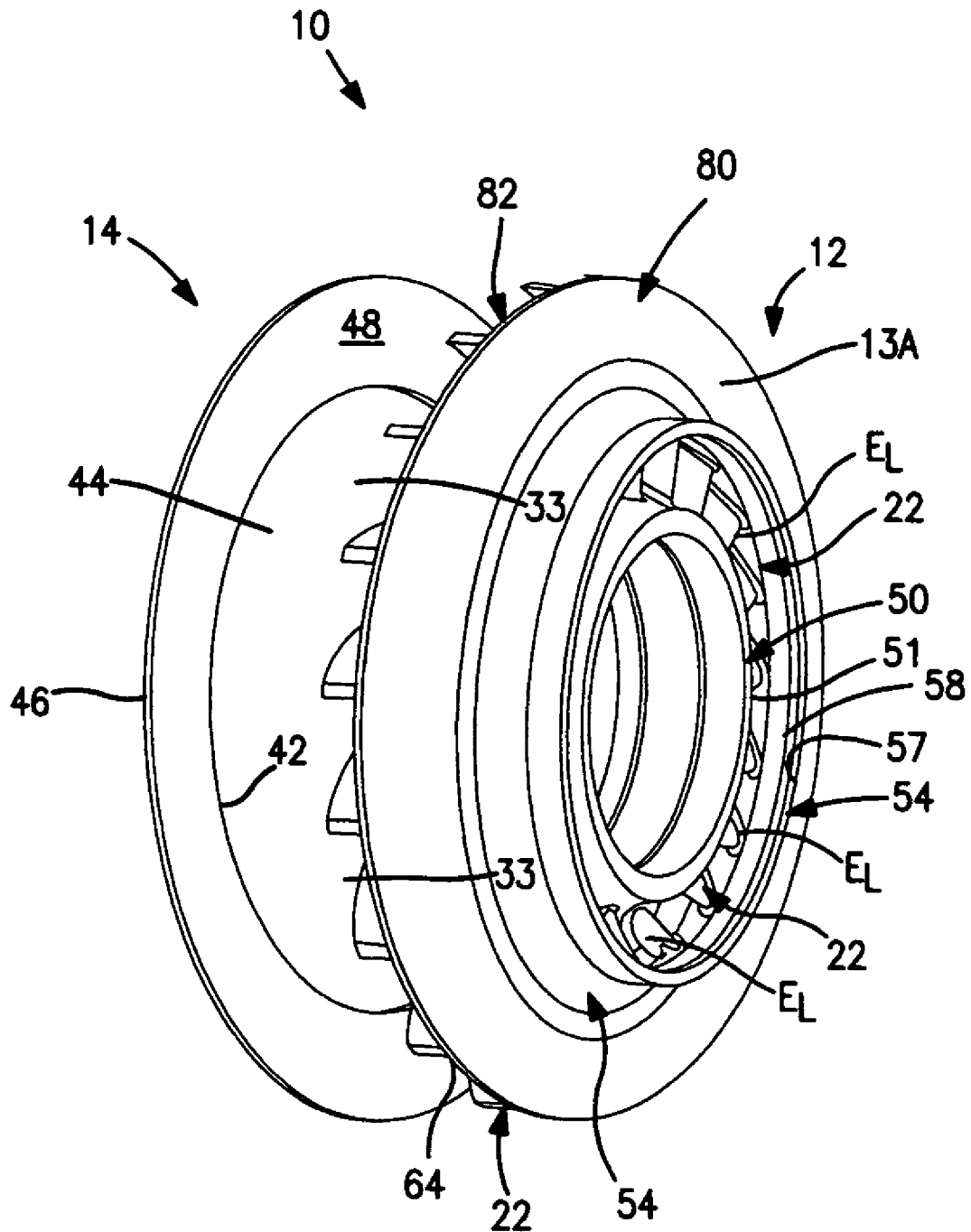
FIG. 11 is a front perspective view of the impeller assembly of FIG. 9.

Similarly to the first construction, the second impeller assembly construction may either have a main body 12 with outer blade ends 24 connected only with the cover annular portion 80 and a relatively radially larger access plate 40 (FIGS. 9-13), or the impeller assembly 10 may have a main body 12 with another disc annular portion 84, such that blade ends 24 are integrally formed with both the cover and disc annular portions 80, 84, and a relatively radially smaller plate 40 (FIGS. 14-17). Referring first to FIGS. 9-13, the "larger" access plate 40 is preferably sized such that the plate 40 has an outside diameter $D_{OP}$ that is generally equal to an outside diameter $D_{OA}$ of the cover annular portion 80. In which case, when the plate 40 is mounted to the main body 12, the plate outer circumferential edge surface 46 and the cover annular portion outer edge surface 82 are generally axially aligned at the outer circumferential perimeter of the impeller I, and the blade outer ends 24 are all located proximal to the plate outer edge surface 46 (see FIG. 13). As shown in FIGS. 10 and 13, the plate 40 may be fixedly attached to the main body 12 by joining at least a portion of the plate inner circumferential edge surface 42 with the disc portion outer circumferential edge surface 59, so as to form a circumferential joint $J_C$. Additionally or alternatively to the circumferential joint $J_C$, the plate contact surface 48 may be joined with at least a portion of at least one, and preferably all, of the blade mounting surfaces $S_M$ to thereby form one or more separate linear joint $J_L$.

Referring to FIGS. 14-17, with the impeller structure having a smaller plate 40 and a disc outer annular portion 84, the plate outside diameter $D_{OP}$ is lesser than the disc outer annular portion outside diameter $D_{OA}$ (see FIG. 16). The outer annular portion 84 is disposed generally coaxially about the disc annular portion 52, is spaced axially from the cover annular portion 80, and has inner and outer circumferential edge surfaces 85, 87 and an inside diameter $D_{IA}$. The inner circumferential surface 85 is spaced radially outwardly from the outer circumferential edge surface 59 of the disc annular portion 52, such that a generally annular gap $G_{AD}$ is defined between the disc inner and outer annular portions 52, 84. The disc gap $G_{AD}$ is sized to receive at least a portion of the access plate 40, such that the plate 40 is disposeable generally between the two main body disc portions 52, 84. As best shown in FIGS. 14 and 16, each blade mounting surface $S_M$ extends generally radially between the facing circumferential surfaces 59, 85, and thus generally across the annular disc gap $G_{AD}$, and the blade body outer ends 64 are all integrally connected with both the cover and disc annular portions 80, 84, eliminating any welding, brazing, etc. at the blade "trailing" edges $E_T$, as discussed above.

Further, as depicted in FIGS. 16 and 17, when the second body plate 40 is mounted to the main body 12, the plate 40 may be fixedly attached by joining at least a portion of the plate inner circumferential surface 42 with the outer circumferential surface 59 of the disc annular portion 52, to form an inner circumferential joint $J_{CI}$, and/or the plate outer circumferential surface 46 may be joined with the inner circumferential surface 85 of the disc outer annular portion 84, so as to form an outer circumferential joint $J_{CO}$. Alternatively or in addition to the circumferential joints $J_{CI}$, $J_{CO}$, the plate contact surface 48 may be joined with at least a portion of at least one, and preferably all, of the blade mounting surfaces $S_M$ to form one or more separate linear joint $J_L$.

Figure 19:
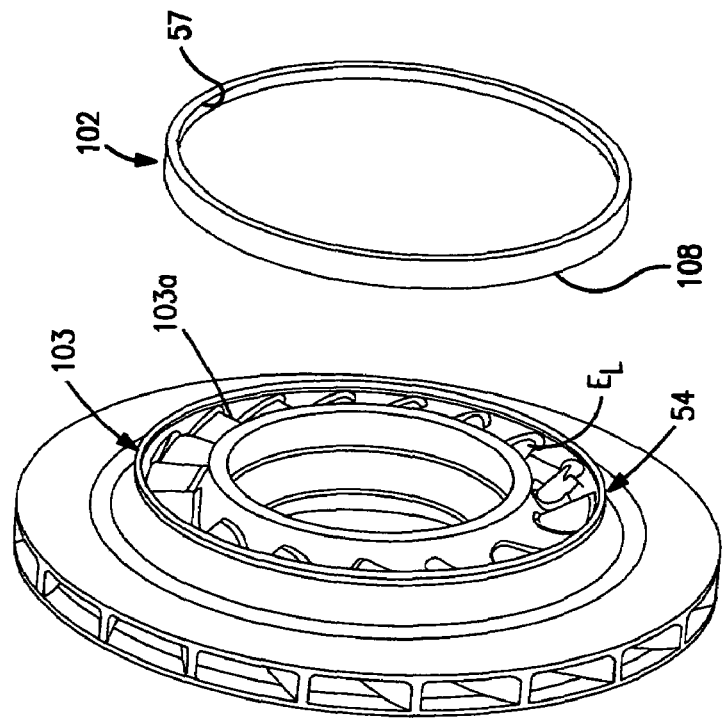
FIG. 19 is a front perspective view of the second impeller construction, shown with an alternative tubular portion structure.
Figure 18:
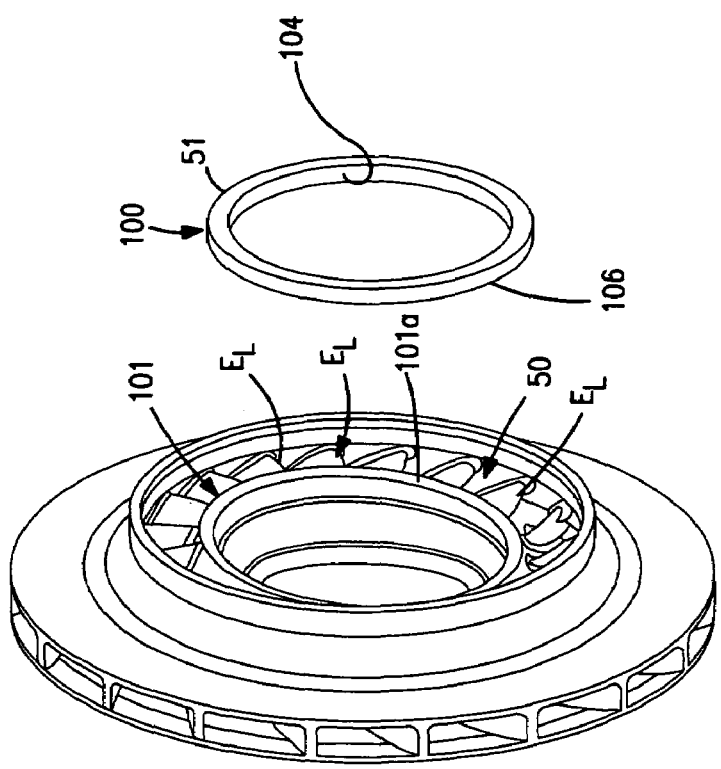
FIG. 18 is a front perspective view of the second impeller construction, shown with an alternative hub portion structure.
Figure 20:
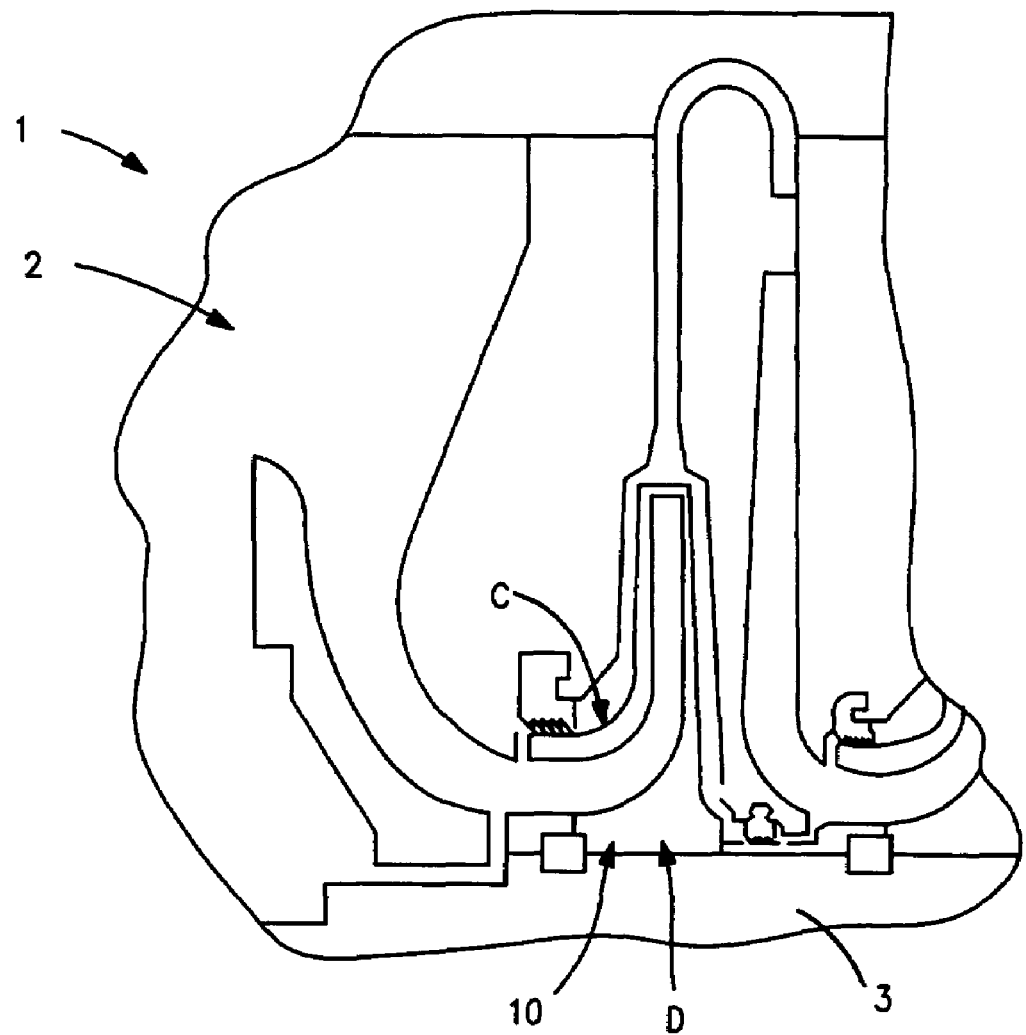
FIG. 20 is a broken-away, cross-sectional view of an exemplary application of the impeller assembly of the present invention, shown mounted on a fluid machinery shaft.

Referring now to FIGS. 18 and 19, with either of the two preferred constructions described above, the impeller main body 12 may be alternatively formed with the hub portion 50 or/and the tubular portion 54 having a separate, outer access ring 100, 102, respectively, fixedly attachable to a remainder or main section 101, 103, respectively, of the hub and tubular portions 50, 54. Specifically, the hub portion 50 may be formed of the hub portion main section 101, which is integrally connected with the blades 20 and at least a part of the tubular portion 54, and the "disc" access ring 100. The disc access ring 100 is generally circular and includes the hub outer edge surface 51 (partly defining annular opening 58 as discussed above), a central opening 104 forming part of the main body through-bore 28, and an end contact surface 106 disposeable against a hub main section contact surface 101a. With this structure, when the disc ring 100 is separate from the hub main section 101, the blade leading edges $E_L$ are more readily accessible for finish machining. Thereafter, the ring 100 is fixedly (or removably) attachable to the main section 101 (e.g., by welding, brazing, mechanical fasteners, etc.) to form the complete hub portion 50.

Alternatively or in addition to the two-piece hub portion 50, the tubular portion 54 may be formed of the main section 103 integrally connected with the blades 20 and at least a part of the hub portion 50 (i.e., the hub main section 101), as discussed above, and the "cover" access ring 102. The cover access ring 102 is generally circular, is disposeable circumferentially about the hub portion 50, and includes the tubular portion inner edge surface 57 (partly defining annular opening 58 described above) and an end contact surface 108 surface disposeable a tubular main portion contact surface 103a. As with the disc ring 100, when the cover ring 102 is separate from the tubular portion main section 103, the blade leading edges $E_L$ are more readily accessible for finish machining, and then the ring 102 is fixedly or removably attachable (e.g., by welding, brazing, bolts, etc.) to the main section 103 to form the complete tubular portion 54. The impeller main body 12 may be formed with both disc and cover access rings 100, 102, thus providing maximum accessibility to the blade leading edges $E_L$, with either the disc ring 100 or the cover ring 102, or with neither rings 100, 102 (i.e., one-piece hub and tubular portions 50, 54).

In all of the above constructions and variations, the main body 12 is preferably formed of a single forging, billet, casting, etc., that is finish machined to the final desired dimensions. The preferred access plate 40 is preferably formed by a second, single casting, forging, stamping, etc., which generally requires minimal, if any, finish machining. This is due to the fact that the plate dimensions are less critical then those of the main body 12, particularly the profile or contours of the blades 20. Once the main body 12 is machined as desired, the access plate 40 is attached thereto to form the completed impeller I, as discussed above.

The impeller assembly 10 of the present invention provides a number of advantages over previous impeller designs. By having at least the blade leading edges $E_L$, and in certain constructions the trailing edges $E_T$ also, integrally connected or formed with the disc D and cover C, no welding, brazing or other joining operation is required at these sections, thus eliminating one potential source of impeller failure, as discussed above. Also, by having the one-piece main body 12 accessible for machining through the openings 32 and passages 30, the interior portions of the impeller I may be fully machined to desired dimensions, and then the access body 14 may be attached thereto. This access provides a major advantage over one-piece impeller designs, for which machining of the interior surfaces of the blades has proven very difficult. Further, when using welding, brazing or similar joining technique (as preferred), the joining process may be performed in a single plane and along simpler linear joints $J_L$ along the blades 20 and circumferential joints $J_C$ about the disc D or cover C.

More specifically, by having joint surface pairs 42/61, 46/72, 42/59, 46/85, or/and 48/$S_M$ (depending on the particular impeller assembly construction) which each are substantially contained within a single plane, the negative effects of gravity on a brazing process is substantially reduced. Also, such joints are far easier to form compared to welding, brazing, etc., between the curved inner portions of the blades 20, i.e., along the body inner bended portions 60a, and the mating curved hub and disc portions 50, 54, and can be accomplished with a 3-axis manipulator as a opposed to a 6-axis manipulator. Further, the required length of the welded or brazed joints along the blades 20 is substantially reduced as compared with welding or brazing along the entire blade length, which reduces the time of required joint inspection (e.g., less fillet weld to blend on fillet welded impellers prior to inspection, etc.), and ultrasonic inspection of such joints in a single plane is much simpler to perform. Also, such reduced length or "shorter" welded or brazed joints require less filler material, which also reduces manufacturing cost.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined in the appended claims.

We claim:

1. An impeller assembly for a fluid machine, the impeller assembly comprising:
   a first, main body having a central axis and including a first section providing at least a substantial portion of one of an impeller disc and an impeller cover, a second section spaced generally axially from the first section and providing a portion of the other one of the disc and the cover, and a plurality of integrally formed blades extending between and connecting the main body first and second sections such that the main body is generally of one piece construction, the main body defining an access opening through which the plurality of integrally formed blades can be machined; and
   a second body providing an entire remainder of the other one of the disc and the cover, the second body being attachable to the main body to substantially cover the access opening and to substantially form an impeller,
   wherein one of the main body first and second sections includes a cylindrical hub portion, the central axis of the main body extending centrally through the hub portion, and an annular portion extending substantially radially outwardly from the hub portion, and
   wherein the other one of the main body first and second sections includes a tubular portion disposed substantially coaxially about the hub portion and spaced apart substantially axially from the annular portion, the plurality of blades extending between and integrally connecting the tubular portion with the hub and annular portions.

2. The impeller assembly as recited in claim 1 wherein each blade has an inner end located generally proximal to the central axis, an opposing outer end, and two spaced apart sides extending generally radially between the two ends, the main body including radially-innermost portions of each one of the disc and the cover such that at least a radially-innermost portion of each one of the two sides of each blade is integrally formed with the main body first and second sections.

3. The impeller assembly as recited in claim 2 wherein one of the two sides of each blade has a radially outermost portion providing a mounting surface, the second body being disposable simultaneously generally against the mounting surfaces of all of the plurality of blades.

4. The impeller assembly as recited in claim 1 wherein:
   the main body has an outer surface, and a plurality of flow channels, each of the flow channels being defined between a separate pair of adjacent blades;
   the access opening comprises a plurality of access openings, each of the plurality of access openings extending between the outer surface and a separate one of the flow channels; and
   the second body is configured to substantially close all of the access openings when the second body is attached to the main body.

5. The impeller assembly as recited in claim 4 wherein each one of the access openings is configured to permit insertion of at least a portion of a tool into the connected channel for machining of the pair of blades defining the channel and interior portions of the disc and cover located generally between the two blades.

6. The impeller assembly as recited in claim 4 wherein:
the main body further has two opposing sides spaced apart along the central axis, each access opening extending generally axially into the main body from one of the two sides; and
the second body includes a generally annular plate disposeable generally against the one side of the main body as to close the access openings.

7. The impeller assembly as recited in claim 4 wherein:
the plurality of blades are spaced apart circumferentially about the main body axis such that each blade extends generally radially with respect to the axis, each blade having an edge surface unconnected with a remainder of the main body, each access opening being defined generally between a separate pair of adjacent blade edge surfaces; and
the second body includes a generally annular plate disposeable simultaneously generally against all of the blade edge surfaces to close the access openings.

8. The impeller assembly as recited in claim 4 wherein each one of the flow channels has an inlet located generally proximal to the central axis and an outlet located generally distally from the central axis.

9. The impeller assembly as recited in claim 1 wherein the second body has a generally planar surface, the planar surface being disposed generally against a portion of each one of the plurality of the blades when the second body is attached to the main body.

10. The impeller assembly as recited in claim 1 wherein the fluid machine includes a rotatable shaft and the main body has a through bore extending axially through the body first and second sections, at least a portion of the machine shaft being disposeable within the main body through bore to couple the impeller with the machine.

11. The impeller assembly as recited in claim 1 wherein the second body includes a generally annular plate having inner circumferential edge surface defining a central opening, an opposing outer circumferential edge surface, and a generally planar surface extending radially between the two edge surfaces, at least one of the planar surface and the two edge surfaces being joined to the main body to attach the second body to the main body.

12. The impeller assembly as recited in claim 11 wherein at least one of:
each of the plate inner and outer edge surfaces are joined to the main body by one of welding, brazing, and mechanical fastening; and
at least a section of the plate interior surface is attached to the first body by one of welding, brazing, and mechanical fastening.

13. The impeller as recited in claim 1 wherein the hub portion has an outer edge surface extending circumferentially about the axis and the tubular portion has an inner edge surface extending circumferentially about the axis, the tubular portion inner edge surface being spaced apart radially from the hub portion outer edge surface such that a generally annular opening is defined between the hub portion edge surface and the tubular portion edge surface.

14. The impeller assembly as recited in claim 13 wherein the main body has a plurality of flow channels, each flow channel being defined between a separate pair of adjacent blades and fluidly connected with the annular opening.

15. The impeller assembly as recited in claim 1 wherein the fluid machine includes a rotatable shaft and the hub portion has two opposing axial ends and a through bore extending axially through the two ends, the through bore being sized to receive at least a portion of the shaft.

16. The impeller assembly as recited in claim 1 wherein:
the main body annular and tubular portions each have an outer circumferential edge surface, the tubular portion outer edge surface being spaced radially inwardly from the annular portion outer edge surface such that each one of the plurality of blades has a side surface extending generally radially between the two outer circumferential edge surfaces, each blade side surface providing a mounting surface; and
the second body includes a generally annular plate having inner and outer circumferential surfaces, the inner surface defining a central opening, and a contact surface extending generally radially between the inner and outer circumferential surfaces, the plate being mountable to the main body such that the tubular portion is generally disposed within the plate central opening and the plate contact surface is generally disposed against all of the blade mounting surfaces.

17. The impeller assembly as recited in claim 16 wherein when the second body is attached to the main body, at least one of:
at least a portion of the plate inner circumferential edge surface is joined with the tubular portion outer circumferential edge surface; and
the plate contact surface is joined with at least a portion of at least one blade mounting surface.

18. The impeller assembly as recited in claim 1 wherein each blade has an elongated body with an inner end located generally proximal to the central axis, an opposing outer end, and two spaced apart sides extending generally radially between the two ends, each blade body having a radially-innermost portion disposed between the hub portion and tubular portion such that a radially-innermost section of one of the two blade body sides is integrally connected with the hub portion and a radially-innermost portion of the other one of the two blade sides is integrally connected with the tubular portion.

19. The impeller assembly as recited in claim 18 wherein the radially-innermost portion of each blade is bended with respect to a remainder of the blade body such that each blade innermost portion extends at least partially along the central axis.

20. An impeller assembly for a fluid machine, the impeller assembly comprising:
a first, main body having a central axis and including a first section providing at least a substantial portion of one of an impeller disc and an impeller cover, a second section spaced generally axially from the first section and providing a portion of the other one of the disc and the cover, and a plurality of integrally formed blades extending between and connecting the main body first and second sections such that the main body is generally of one piece construction; and
a second body providing a remainder of the other one of the disc and the cover, the second body being attachable to the main body to substantially form an impeller,
wherein one of the main body first and second sections includes a generally cylindrical hub portion, the main body axis extending centrally through the hub portion, and a generally annular portion extending generally radially outwardly from the hub portion;

wherein the other one of the main body first and second sections includes a generally tubular portion disposed generally coaxially about the hub portion and spaced apart generally axially from the annular portion, the plurality of blades extending between and integrally connecting the tubular portion with the hub and annular portions;

wherein the main body annular and tubular portions each have an outer circumferential edge surface, the tubular portion outer edge surface being spaced radially inwardly from the annular portion outer edge surface such that each one of the plurality of blades has a side surface extending generally radially between the two outer circumferential edge surfaces, each blade side surface providing a mounting surface;

wherein the second body includes a generally annular plate having inner and outer circumferential surfaces, the inner surface defining a central opening, and a contact surface extending generally radially between the inner and outer circumferential surfaces, the plate being mountable to the main body such that the tubular portion is generally disposed within the plate central opening and the plate contact surface is generally disposed against all of the blade mounting surfaces; and wherein the annular portion is a first annular portion and the main body further includes a second annular portion, the second annular portion being disposed generally coaxially about the tubular portion and having an inner circumferential edge surface spaced radially outwardly from the tubular portion outer circumferential edge surface such that each blade mounting surface extends generally between the tubular portion outer surface and the second annular portion inner surface, the second body plate being disposeable generally between the tubular portion and the second annular portion.

21. The impeller assembly as recited in claim 20 wherein when the second body is attached to the main body, the plate outer circumferential edge surface is joined with the second annular portion inner circumferential edge surface.

22. An impeller assembly for a fluid machine, the impeller assembly comprising:

a first, main body having a central axis and including a first section providing at least a substantial portion of one of an impeller disc and an impeller cover, a second section spaced generally axially from the first section and providing a portion of the other one of the disc and the cover, and a plurality of integrally formed blades extending between and connecting the main body first and second sections such that the main body is generally of one piece construction; and a second body providing a remainder of the other one of the disc and the cover, the second body being attachable to the main body to substantially form an impeller, wherein one of the main body first and second sections includes a generally cylindrical hub portion, the main body axis extending centrally through the hub portion, and a generally annular portion extending generally radially outwardly from the hub portion;

wherein the other one of the main body first and second sections includes a generally tubular portion disposed generally coaxially about the hub portion and spaced apart generally axially from the annular portion, the plurality of blades extending between and integrally connecting the tubular portion with the hub and annular portions;

wherein the main body annular and tubular portions each have an outer circumferential edge surface, the tubular portion outer edge surface being spaced radially inwardly from the annular portion outer edge surface such that each one of the plurality of blades has a side surface extending generally radially between the two outer circumferential edge surfaces, each blade side surface providing a mounting surface;

wherein the second body includes a generally annular plate having inner and outer circumferential surfaces, the inner surface defining a central opening, and a contact surface extending generally radially between the inner and outer circumferential surfaces, the plate being mountable to the main body such that the tubular portion is generally disposed within the plate central opening and the plate contact surface is generally disposed against all of the blade mounting surfaces; and wherein the annular portion is a first annular portion and the main body further includes a second generally annular portion, the second annular portion being disposed generally coaxially about the tubular portion such that a generally annular gap is defined between the second annular portion and the tubular portion, the gap being sized to receive at least a portion of the second body plate.

23. An impeller assembly for a fluid machine, the impeller assembly comprising:

a first, main body having a central axis and including a first section providing at least a substantial portion of one of an impeller disc and an impeller cover, a second section spaced generally axially from the first section and providing a portion of the other one of the disc and the cover, and a plurality of integrally formed blades extending between and connecting the main body first and second sections such that the main body is generally of one piece construction; and a second body providing a remainder of the other one of the disc and the cover, the second body being attachable to the main body to substantially form an impeller, wherein one of the main body first and second sections includes a generally cylindrical hub portion, the main body axis extending centrally through the hub portion, and a generally annular portion extending generally radially outwardly from the hub portion;

wherein the other one of the main body first and second sections includes a generally tubular portion disposed generally coaxially about the hub portion and spaced apart generally axially from the annular portion, the plurality of blades extending between and integrally connecting the tubular portion with the hub and annular portions;

wherein the annular portion is a first annular portion and has an outer circumferential surface, the main body further has a second generally annular portion integrally formed with and extending radially outwardly from the tubular portion, the second annular portion having an outer circumferential surface spaced radially outwardly from the first annular portion outer surface such that each one of the plurality of blades has a side surface extending generally radially between the first and second annular portion outer circumferential edge surfaces, each blade side surface providing a mounting surface; and wherein the second body includes a generally annular plate having inner and outer circumferential edge surfaces, the inner edge surface defining a central opening, and a contact surface extending generally radially between the inner and outer edge surfaces, the plate being mountable to the main body such that the first annular portion is generally disposed within the plate central opening and the plate contact surface is generally disposed against all of the blade mounting surfaces.

24. The impeller assembly as recited in claim 23 wherein when the second body is attached to the main body, at least one of:

at least a portion of the plate inner circumferential surface is joined with the tubular portion outer circumferential surface; and the plate contact surface is joined with at least a portion of at least one blade contact surface.

25. The impeller assembly as recited in claim 23 wherein the main body further includes a third annular portion disposed generally coaxially about the first annular portion and having an inner circumferential edge surface spaced radially outwardly from the first annular portion outer circumferential edge surface such that each blade mounting surface extends generally between the first annular portion outer surface and the third annular portion inner surface, the second body plate being disposeable generally between the first and third annular portions.

26. The impeller assembly as recited in claim 25 wherein the plate outer circumferential surface is joined with the third annular portion inner circumferential surface when the second body is attached to the main body.

27. The impeller assembly as recited in claim 23 wherein the main body further includes a third generally annular portion disposed generally coaxially about the first annular portion such that a generally annular gap is defined between the first and third annular portions, the gap being sized to receive at least a portion of the second body plate.

* * * * *